(12) United States Patent
Luo

(10) Patent No.: US 9,158,339 B2
(45) Date of Patent: Oct. 13, 2015

(54) SOLAR NOTEBOOK COMPUTER

(75) Inventor: Jin Luo, Shenzhen (CN)

(73) Assignee: SHENZHEN PCHOOD TECHNOLOGY CO., LTD., Shenzhen, Guangdong (CN)

( * ) Notice: Subject to any disclaimer, the term of this patent is extended or adjusted under 35 U.S.C. 154(b) by 868 days.

(21) Appl. No.: 13/380,816

(22) PCT Filed: Jun. 25, 2010

(86) PCT No.: PCT/CN2010/074538
§ 371 (c)(1),
(2), (4) Date: Dec. 24, 2011

(87) PCT Pub. No.: WO2010/149082
PCT Pub. Date: Dec. 29, 2010

(65) Prior Publication Data
US 2012/0092827 A1     Apr. 19, 2012

(30) Foreign Application Priority Data

Jun. 25, 2009   (CN) .......................... 2009 1 0108341

(51) Int. Cl.
*G06F 1/18*   (2006.01)
*G06F 1/16*   (2006.01)
*H02J 7/35*   (2006.01)
*H02S 30/20*  (2014.01)

(52) U.S. Cl.
CPC ............... *G06F 1/1635* (2013.01); *H02J 7/355* (2013.01); *H02S 30/20* (2013.01)

(58) Field of Classification Search
CPC ..................... G06F 1/1635; G06F 1/26–1/305
See application file for complete search history.

(56) References Cited

U.S. PATENT DOCUMENTS

| 5,814,906 | A  | * | 9/1998 | Spencer et al. | ............... | 307/150 |
| 2007/0072443 | A1 | * | 3/2007 | Rohrbach et al. | ............... | 439/39 |
| 2008/0092941 | A1 | * | 4/2008 | Kuo | ............................. | 136/248 |

\* cited by examiner

*Primary Examiner* — Ramon Barrera
(74) *Attorney, Agent, or Firm* — Raymond Y. Chan; David and Raymond Patent Firm

(57) ABSTRACT

A solar notebook computer includes a storage battery and at least one solar panel. The solar panel is connected electronically with said storage battery through a regulated constant current circuit unit, and, the regulated constant current circuit unit is inside of the host of the notebook computer or outside of the notebook computer. Said at least one solar panel is movably set on the casing of the notebook computer through a connecting equipment. The solution is simple, easy to carry, conductive to environmental protection and expands the functions of the notebook computer.

1 Claim, 12 Drawing Sheets

SOLAR NOTEBOOK COMPUTER

BACKGROUND OF THE PRESENT INVENTION

1. Field of Invention

The present invention relates to notebook computer.

2. Description of Related Arts

Conventional notebook computer is limited by the capacity of rechargeable battery and the battery life for powering the continuous operation of the notebook computer is short. When the notebook computer is used outdoor, the display of the notebook computer may easily be interfered by environmental lighting and therefore may not function properly or may not be able to power other electronic devices such as cellular phone, digital camera or media player.

SUMMARY OF THE PRESENT INVENTION

An object of the present invention is to provide a solution to solve the problem of conventional notebook computer by providing a solar notebook computer which is capable of utilizing solar energy directly and convert solar energy into electrical energy for power the notebook computer, blocking environmental lighting interference to the display, and providing power to other electronic devices such as cellular phone, digital camera and media player.

Additional advantages and features of the invention will become apparent from the description which follows, and may be realized by means of the instrumentalities and combinations particular point out in the appended claims.

According to the present invention, the foregoing and other objects and advantages are attained by a solar notebook computer which comprises a computer body, a central processing unit received inside the computer body, comprising:

a storage battery;

at least one solar panel;

a constant voltage-constant current circuit unit connecting the storage battery and the solar panel, wherein the constant-voltage-constant current circuit unit is internally provided in the central processing unit of the notebook computer or is externally provided to the notebook computer; and a connecting arrangement connecting the solar panel onto the computer body of the notebook computer in a moveable manner.

Furthermore, the connecting arrangement is the connecting arrangement comprises a connecting axis or a rotatable connecting axis, wherein the connecting axis or the rotatable connecting axis is positioned at a peripheral portion of the computer body of the notebook computer and the solar panel is moveably connected to the connecting axis.

Furthermore, the connecting axis or the rotatable connecting axis is positioned on an upper portion of a display of the computer body and/or a bottom portion of a operation panel of the computer body of the notebook computer;

when the notebook computer is under a close condition at which the display and the operation panel is overlapped, the solar panel is folded to provided on top of or below the notebook computer through the connecting axis or the rotatable connecting axis;

when the notebook computer is under an open condition at which the display and the operation panel is open, the solar panel is horizontally extended or horizontally extended at an inclined angle through the connecting axis or the rotatable connecting axis to provide on the upper portion of the display and/or horizontally extended through the connecting axis or the rotatable connecting axis to provide on the bottom portion of the operation panel of the computer body.

Furthermore, the solar panel is connected onto the notebook computer in a moveable manner through a conducting arrangement.

Furthermore, the conducting arrangement comprises a pair of first conductive terminals provided on the peripheral portion of the computer body of the notebook computer; and a pair of second conductive terminals corresponding to the pair of first conductive terminals provided on the solar panel.

Preferably, the pair of first conductive terminals are positioned at an exterior portion of the computer body in such a manner that when the notebook computer is under a close condition at which a display and an operation panel are overlapped, the solar panel is positioned on top of the computer body of the notebook computer while the first conductive terminals and the second conductive terminals are in contact.

Preferably, the second conductive terminals comprise a magnetic element provided therein.

Furthermore, a pair of first conductive terminals is further provided on the peripheral portion of the computer body of the notebook computer; at least one slot is provided on the peripheral portion of the computer body of the notebook computer; at least one protruded element is provided on the solar panel which has a thickness complementary to a width of the slot arranged for sliding into the slot; and a pair of second conductive terminals corresponding to the pair of first conductive terminals are provided on the protruded element, wherein the slot defines an inner side surface at which the pair of first conductive terminals are positioned.

Preferably, the slot is positioned on an upper portion of a display of the notebook computer or on the computer body of the notebook computer;

wherein when the notebook computer is under a close condition at which the display and an operation of the notebook computer are overlapped into position, the solar panel is provided on top of the notebook computer while the first conductive terminals and the second conductive terminals are in contact;

wherein when the notebook computer is under an open condition at which the display and the operation panel is open, the solar panel is horizontally extended through the protruded element being inserted and received inside the slot to provide on the upper portion of the display or to provide on the computer body of the notebook computer.

Preferably, a light blocking unit is provided, which is moveably connected to the solar panel.

Preferably, the solar notebook computer further comprises an external storage battery unit, wherein the external storage battery unit comprises a super capacitor and/or rechargeable battery and a protection circuit, wherein the super capacitor and/or rechargeable battery has a thickness which is smaller than 10 mm and is installed between the solar panel and the computer body of the notebook computer.

Preferably, if the constant voltage-constant current circuit unit is externally provided to the notebook computer, the constant voltage-constant current circuit unit has an input terminal which is connected to the solar panel through a regulator; and an output terminal connected to the storage battery for electrically connecting the solar panel and the storage battery.

The present invention has the following advantageous effect: the solar panel can be mounted to connect or moveably connected to the notebook computer at a position which is towards the inner side or the outer side of the display. The moveably connected solar panel can be extended and expanded horizontally to position at the upper portion of the display. Accordingly, the solar panel can collect solar energy, and block any environmental light and stop any light interference to the notebook computer at the same time. Since the solar panel is moveably connected to the notebook computer, the notebook computer can be easily carried and have a compact structural construction. The present invention can make use of the solar energy to convert into electricity which can be used by the notebook computer directly or can be stored in an energy storage unit to supply power to the notebook computer in the absence of sunlight, thereby widen the usable environmental condition of the notebook computer. The energy storage unit can be connected to a regulator and an output terminal for providing power to electronic devices such as cellular phone, digital camera and media player, thereby increasing the functionality of the notebook computer.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The present invention is further described in details with the accompany drawings in view of principles and features. The exemplary embodiments are provided for further illustrations and are not intended to be limiting the scope of the present invention.

Figure 1:
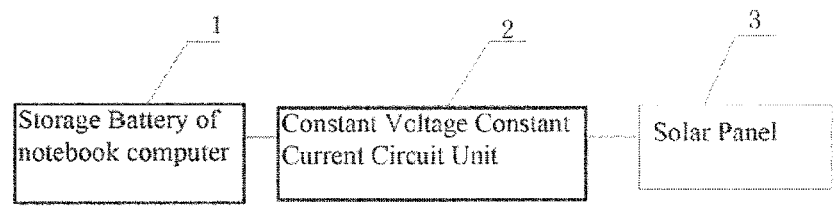
FIG. 1 is a schematic illustration of the exemplary embodiment 1 for showing the connection relationship of different elements according to a preferred embodiment of the present invention.

Exemplary Embodiment 1: Referring to FIG. 1 of the drawings, the solar notebook computer includes a storage battery 1 and at least one solar panel 3. The solar panel is connected to the storage battery 1 through a constant voltage constant current circuit unit 2. Under this setting, the constant voltage constant current circuit unit is usually provided internally to the central processing unit of the notebook computer.

Figure 2:
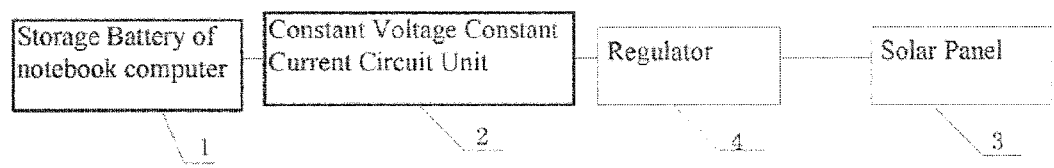
FIG. 2 is an illustration of the exemplary embodiment 2 in which the constant voltage constant current circuit unit is externally provided according to the above preferred embodiment of the present invention.

Exemplary Embodiment 2: Referring to FIG. 2 of the drawings, the solar notebook computer is the same as the exemplary embodiment 1 except that the constant voltage constant current circuit unit has an input terminal which electrically connects to the solar panel through a regulator 4, and an output terminal connecting to the storage battery. Under this setting, the constant voltage constant current circuit unit is usually provided externally to the notebook computer.

Figure 3:
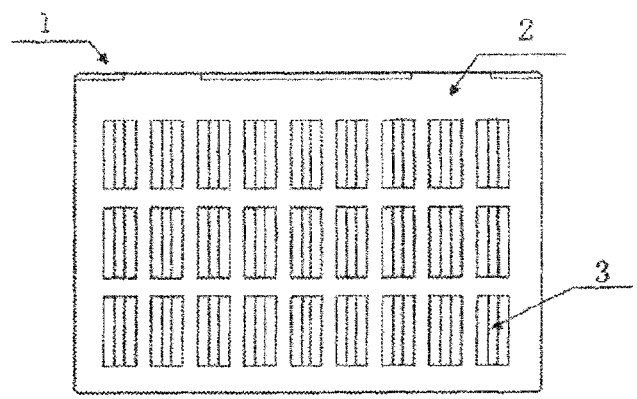
FIG. 3 is a structural illustration of the exemplary embodiment 3 according to the above preferred embodiment of the present invention.

Exemplary Embodiment 3: Referring to FIG. 3 of the drawings, the solar notebook computer is under the condition that the notebook computer 1 is under a close condition. The notebook computer comprises a computer casing 2 which is connected to the solar panel 3. The solar panel 3 is sealed and installed by transparent materials.

Figure 4:
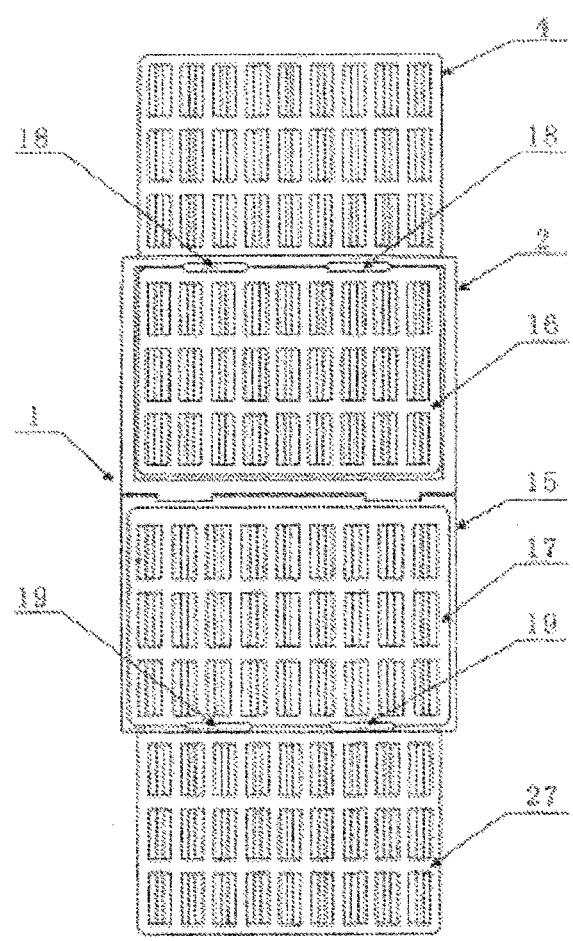
FIG. 4 is a structural illustration of the exemplary embodiment 4 under an open condition according to the above preferred embodiment of the present invention.
Figure 5:
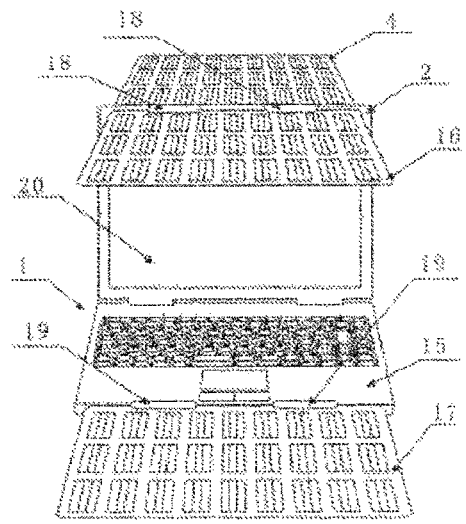
FIG. 5 is a structural illustration of the exemplary embodiment 4 when the notebook computer is in use according to the above preferred embodiment of the present invention.
Figure 6:
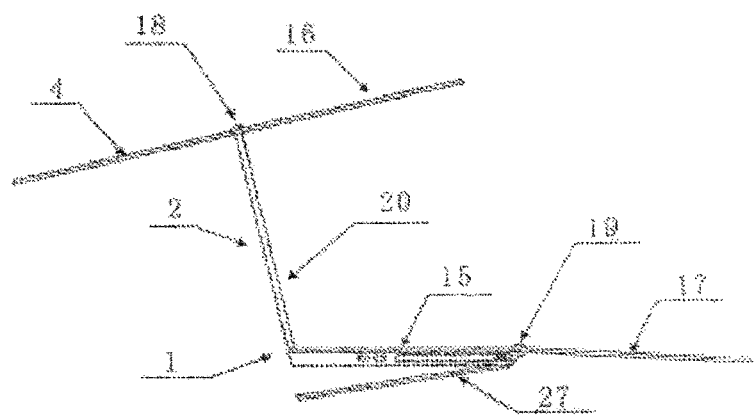
FIG. 6 is a side structural illustration of the exemplary embodiment 4 when the notebook computer is in use according to the above preferred embodiment of the present invention.

Exemplary Embodiment 4: Referring to FIGS. 4, 5 and 6 of the drawings, the solar notebook computer comprises 4 solar panels which are moveably connected to the computer casing 2 of the notebook computer through a connecting arrangement. The connecting arrangement is a connecting axis. The connecting axis is provided on a peripheral portion of the computer casing of the notebook computer, and the solar panel is moveably connected to the connecting axis.

As shown in FIG. 4, the notebook computer 1 is under an open condition. A first connecting axis 18 is connected to a first solar panel 16, a third solar panel 4 is provided on the upper portion of the display 2; a second connecting axis 19 is connected to a second solar panel 17 and a fourth solar panel 27 is provided on a bottom portion of an operation panel of the computer casing 15; the first solar panel 16 and the second solar panel 17 are arranged to covering the display of the notebook computer and the operation panel of the notebook computer respectively.

As shown in FIGS. 5 and 6, the solar notebook computer is under the condition that the notebook computer 1 is in use, the first connecting axis 18 is connected to the first solar panel 16, the third solar panel 4 is provided on the upper portion of the display 2 of the notebook computer, and the first solar panel 16 and the third solar panel 4 is horizontally extended; the second connecting axis 19 is connected to the second solar panel 17, the fourth solar panel 27 is provided on a bottom of the operation panel of the computer casing 15, the second solar panel 17 is horizontally extended and the fourth solar panel 27 is folded at a reversed direction to provide at a position below the notebook computer.

Figure 7:
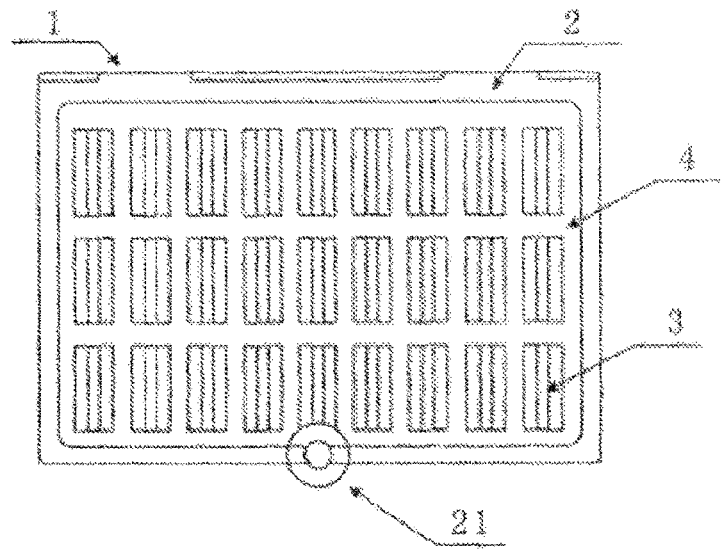
FIG. 7 is a structural illustration of the exemplary embodiment 5 under a close condition according to the above preferred embodiment of the present invention.
Figure 8:
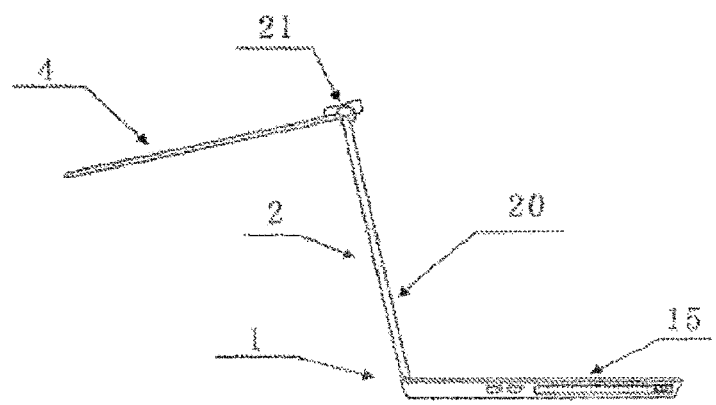
FIG. 8 is a structural illustration of the exemplary embodiment 5 when the notebook computer is in use according to the above preferred embodiment of the present invention.
Figure 9:
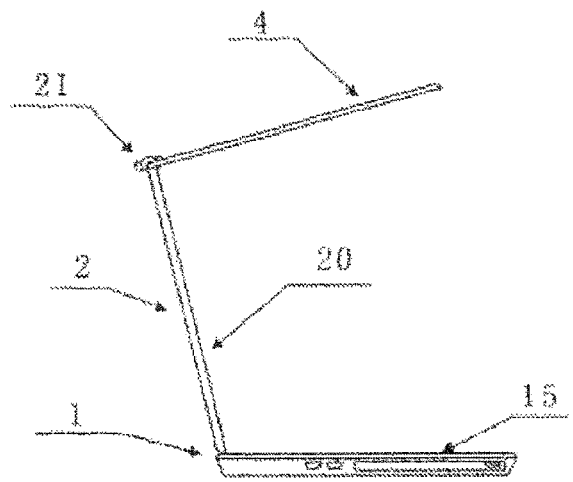
FIG. 9 is a side structural illustration of the exemplary embodiment 5 when the notebook computer is in use according to the above preferred embodiment of the present invention.

Exemplary Embodiment 5: Referring to FIGS. 7, 8 and 9 of the drawings, the solar notebook computer is the same as the exemplary embodiment 4 except that only one solar panel is moveably connected to the notebook computer through the connecting arrangement. The connecting arrangement is a rotatable connecting axis.

As shown in FIG. 7, the solar notebook computer is under the condition that the notebook computer 1 is under a close condition, the rotatable connecting axis 21 is connected to the solar panel 4 and is provided on the upper portion of the display of the computer casing of the notebook computer.

As shown in FIGS. 8 and 9, the solar notebook computer is in use. The display 20 of the notebook computer and the main unit 15 is open, and the solar panel 4 is unfolded and is connected through the rotatable connecting axis in such a manner that a positioning angle between the solar panel and the display can be adjusted freely on the upper portion of the display of the computer casing 2.

Figure 10:
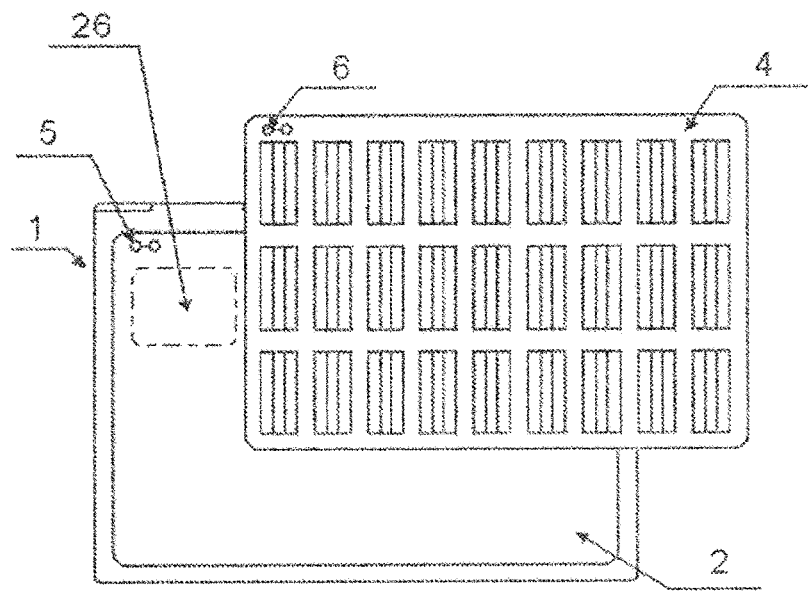
FIG. 10 is a structural illustration of the exemplary embodiment 6 according to the above preferred embodiment of the present invention.

Exemplary Embodiment 6: Referring to FIG. 10 of the drawings, the solar notebook computer is illustrated. The solar panel is moveably connected to the notebook computer through a conducting arrangement. In this way, the solar panel 4 and the notebook computer 1 can be completely separated. The conducting arrangement includes one pair of first conductive terminals 5 on the computer body of the notebook computer; and one pair of second conductive terminals 6 corresponding to the pair of first conductive terminals provided on the solar panel. The constant voltage constant current circuit unit 26 is internally provided to the notebook computer 1.

Figure 11:
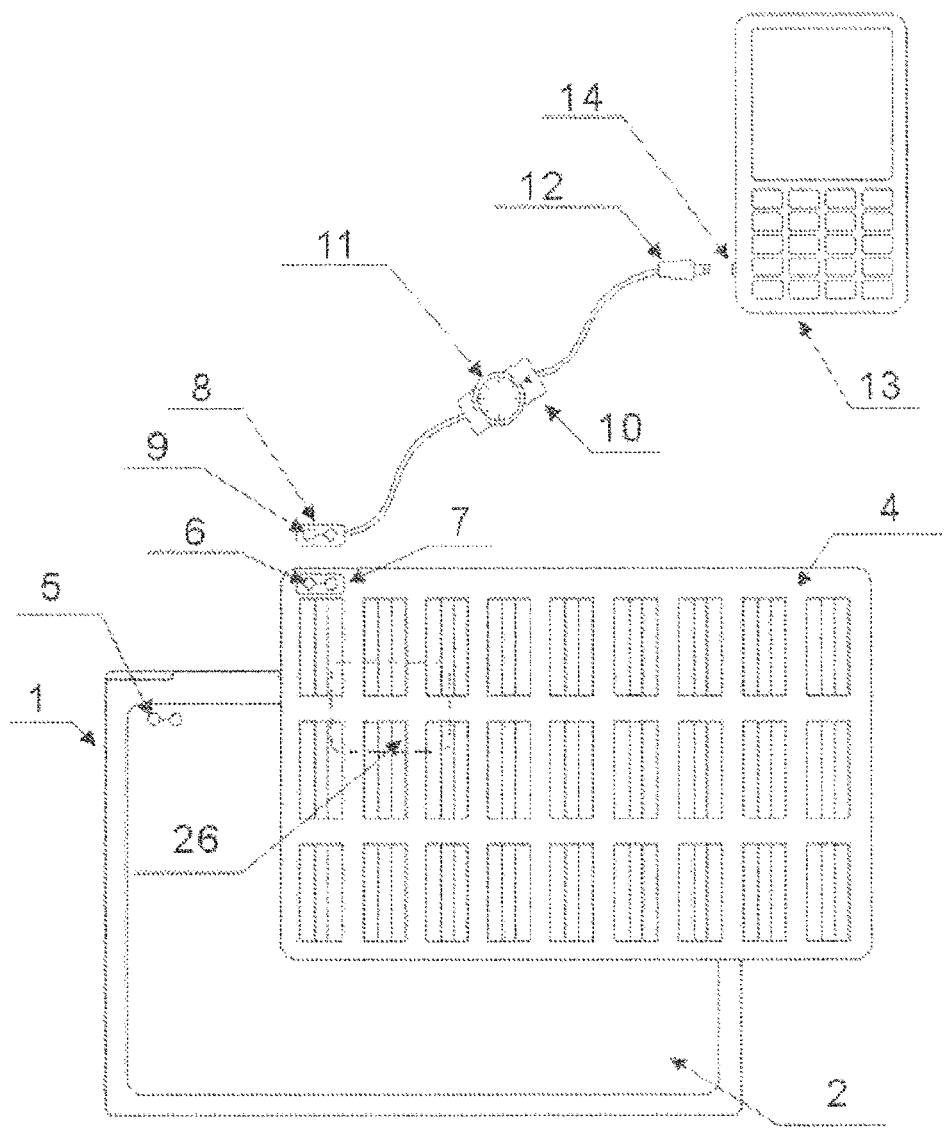
FIG. 11 is a structural illustration of the exemplary embodiment 7 according to the above preferred embodiment of the present invention.

Exemplary Embodiment 7: Referring to FIG. 11 of the drawings, the solar notebook computer is the same as the exemplary embodiment 6 except that the pair of second conductive terminals 6 further comprises a magnetic element 7. The magnetic element 7 is arranged for facilitating connection of other electronic devices to position onto the conductive terminals conveniently.

As shown in FIG. 11, the casing of the display 2 of the notebook computer and the solar panel 4 have provided the first conductive terminals 5 and the second conductive terminals 6 respectively; a connecting wire is formed by an electric input terminal unit 8 which is made in magnetic materials, a regulator 11 and an electric output terminal unit 12; the second conductive terminals 6 define a peripheral portion at which the magnetic element 7 is provided, the conductive terminal 9 which is provided in the electric input terminal unit 8 and the conductive terminal 6 which is provided on the solar panel 4 can be completely separated or moveably connected, the electrical energy generated by the solar panel 4 can be transmitted through the electric input terminal unit 8 of the connecting wire 10 to pass through the regular 11 to the output terminal unit 12 so as to reach the input terminal 14 of a cellular phone 14, a personal digital device. The constant voltage constant current circuit unit is internally provided to the solar panel.

Exemplary Embodiment 8: Referring to FIGS. 12 to 18 of the drawings, the solar notebook computer is the same as the exemplary embodiment 7 except that the solar panel of the solar notebook computer is moveably connected to the notebook computer through a conducting arrangement. The conducting arrangement includes four slots provided onto the notebook computer; the solar panel includes a protruded element, the protruded element has provided with the conductive terminals at a position corresponding to the slot. The slot and the protruded element are complementary to each other.

Figure 12:
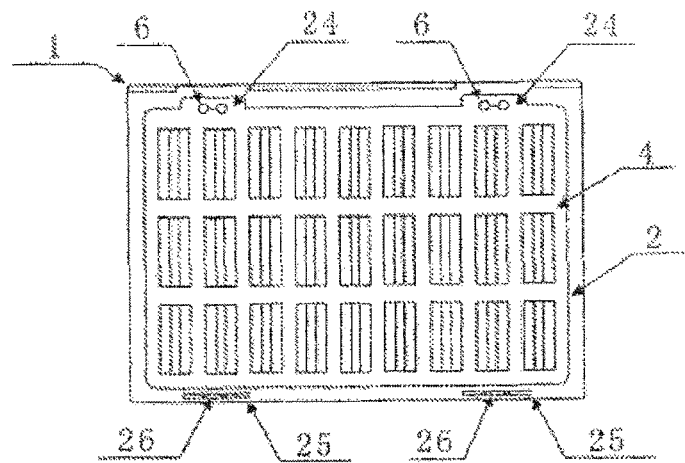
FIG. 12 is a structural illustration of the exemplary embodiment 8 under a close condition according to the above preferred embodiment of the present invention.

As shown in FIG. 12, the solar notebook computer is under a close condition. The solar panel 4 is moveably connected to the notebook computer at a position which is on top of the display 2. The solar panel 4 includes a protruded element 24 provided thereon. The protruded element 24 includes the pair of second terminals 6. The slot 25 is provided onto the peripheral portion of the display 2 of the notebook computer. The slot 25 further defines a resilient conductive terminal 26 on an inner side.

Figure 13:
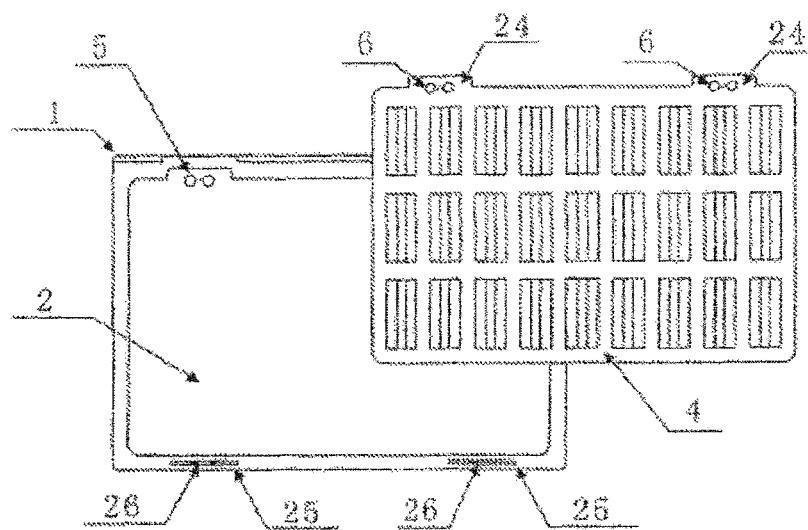
FIG. 13 is a structural illustration of the exemplary embodiment 8 under a close condition and the solar panel is separately provided according to the above preferred embodiment of the present invention.

As shown in FIG. 13, the solar notebook computer is under a close condition. The solar panel 4 is detached and separated from the display 2 of the notebook computer.

Figure 14:
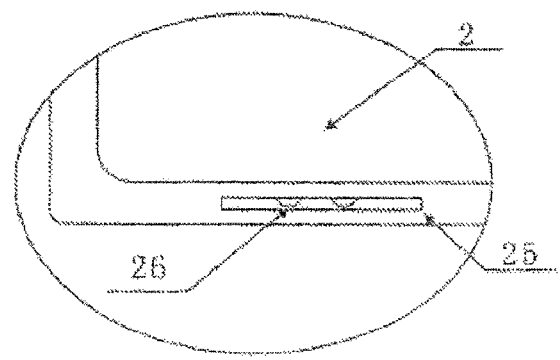
FIG. 14 is a structural illustration of the exemplary embodiment 8 showing an enlarged view of the slot according to the above preferred embodiment of the present invention.

As shown in FIG. 14, the slot 25 is provided on a side of the display 2 of the notebook computer at the peripheral portion. The resilient conductive terminal 26 is positioned in the inner side of the slot 25.

Figure 15:
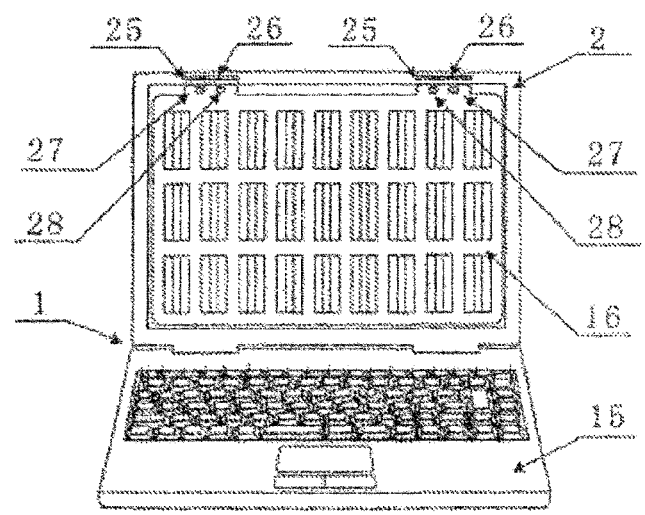
FIG. 15 is a structural illustration of the exemplary embodiment 8 under an open condition according to the above preferred embodiment of the present invention.

As shown in FIG. 15, the solar notebook computer 1 is under an open condition. The solar panel 16 is provided onto the display 2 of the notebook computer. The slot 26 is provided inside the computer body at an upper portion of the display of the computer body. The solar panel 16 includes a protruded element 27. The protruded element 27 includes two protruded members 28.

Figure 16:
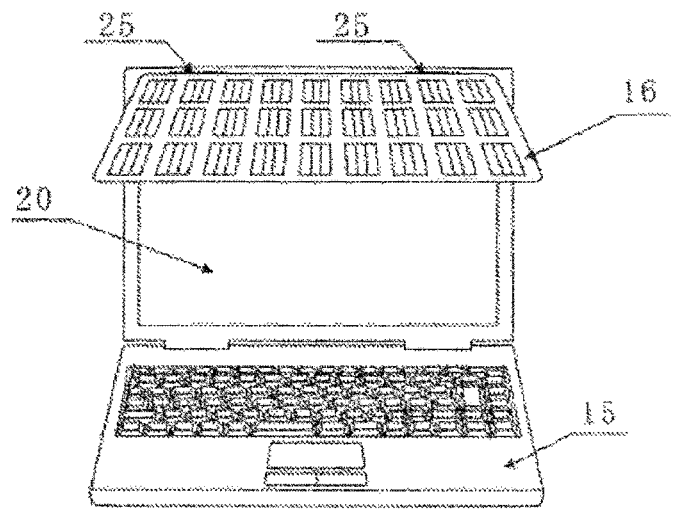
FIG. 16 is a front structural illustration of the exemplary embodiment 8 when the notebook computer is in use according to the above preferred embodiment of the present invention.
Figure 17:
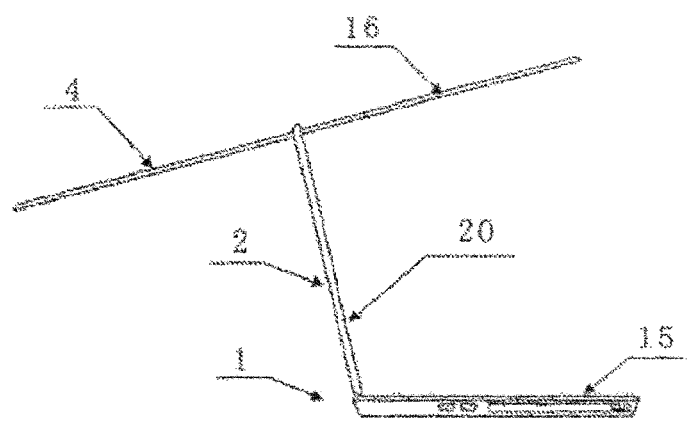
FIG. 17 is a side structural illustration of the exemplary embodiment 8 when the notebook computer is in use according to the above preferred embodiment of the present invention.
Figure 18:
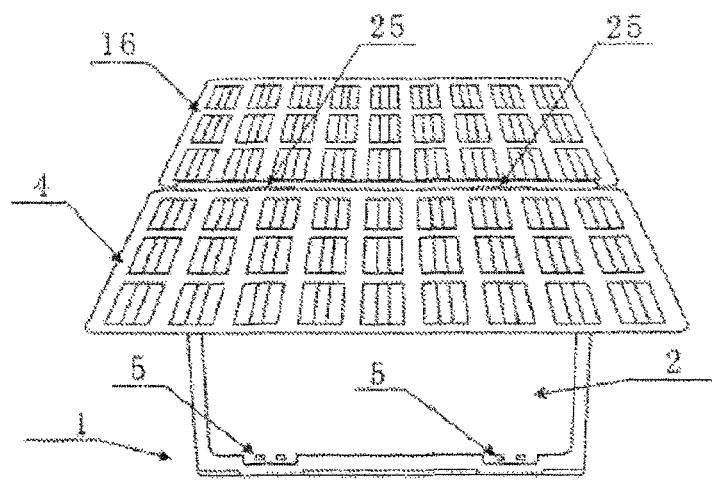
FIG. 18 is a rear structural illustration of the exemplary embodiment 8 when the notebook computer is in use according to the above preferred embodiment of the present invention.

As shown in FIGS. 16, 17 and 18, the solar notebook computer 1 is in use. The first solar panel 16 is horizontally extended and is inserted into the slot 25 of the upper portion of the display 20 of the notebook computer to secure into position. The second solar panel is inserted to the computer body 2 of the notebook computer.

Figure 19:
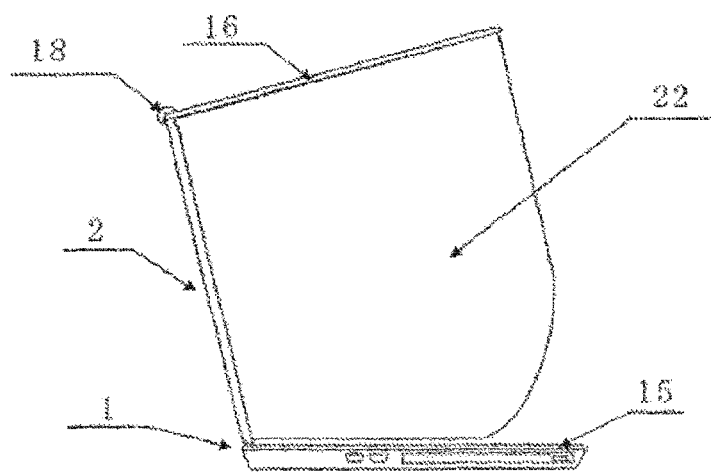
FIG. 19 is a structural illustration of the exemplary embodiment 9 under an open condition according to the above preferred embodiment of the present invention.
Figure 20:
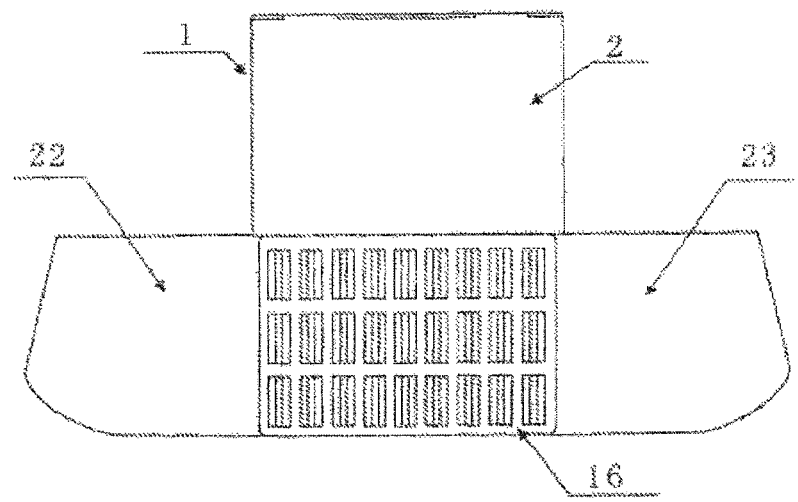
FIG. 20 is a structural illustration of the exemplary embodiment 9 under a close condition according to the above preferred embodiment of the present invention.

Exemplary Embodiment 9: Referring to FIGS. 19 and 20, based on the structural construction of any one of the above exemplary embodiments, the solar panel further comprises a light blocking unit moveably connected to the solar panel. Under strong light condition, the notebook computer can be shaded and used as usual.

As shown in FIG. 19, the solar notebook computer is in use. The connecting axis 18 is connected to the solar panel 16 to secure on top of the display 2 of the notebook computer. The solar panel 16 includes two light blocking units 22 on two sides respectively.

As shown in FIG. 20, the solar notebook computer is under a closed condition. The light blocking unit 22 can be folded or unfolded to extend with respect to the solar panel.

Figure 21:
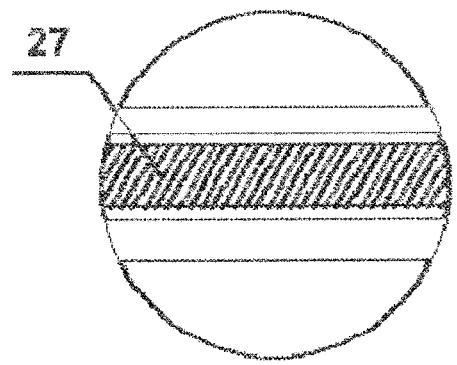
FIG. 21 is a structural illustration of the exemplary embodiment 10 according to the above preferred embodiment of the present invention.

Exemplary Embodiment 10: As shown in FIG. 21, based on the structural construction of any one of the above exemplary embodiments, the solar computer notebook further comprises an external storage battery unit which includes a super capacitor or a rechargeable battery and a protection circuit 27. The super capacitor or the rechargeable battery is smaller than 10 mm and is installed between the computer body and the solar panel.

Figure 22:
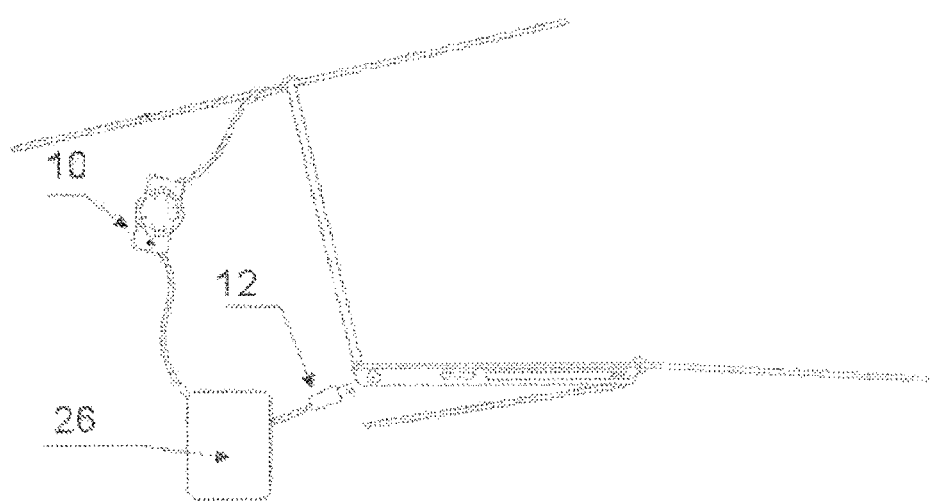
FIG. 22 is a structural illustration of the exemplary embodiment 11 according to the above preferred embodiment of the present invention.

Exemplary Embodiment 11: As shown in FIG. 22, based on the structural construction of any one of the above exemplary embodiments, the constant voltage-constant current circuit unit is externally provided to the notebook computer. The constant voltage-constant current circuit unit 26 has an input terminal 12 to connect to the notebook computer. The constant voltage-constant current circuit unit 26 is connected to the solar panel through a regulator 10.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A solar notebook computer which includes a computer body, a central processing unit and a storage battery; comprising:

at least one solar panel;

a constant voltage-constant current circuit unit electrically connecting said solar panel and said storage battery, and internally provided in the central processing unit of the notebook computer or externally provided to the notebook computer;

a connecting arrangement connecting said solar panel onto the computer body of the notebook computer in a moveable manner;

a conducting arrangement connecting said solar panel onto the notebook computer in a moveable manner; and a pair of first conductive terminals provided on said peripheral portion of said computer body of the notebook computer; at least one slot provided on said peripheral portion of said computer body of the notebook computer; at least one protruded element provided on said solar panel which has a thickness complementary to a width of said slot arranged for sliding into said slot; and a pair of second conductive terminals provided on said protruded element, wherein said slot defines an inner side surface which provides a resilient terminal corresponding to said second terminals, wherein said slot is positioned on an upper portion of a display of the notebook computer or on said computer body of the notebook computer, wherein when the notebook computer is under a close condition at which the display and an operation panel of the notebook computer are overlapped into position, said solar panel is provided on top of the notebook computer while said first conductive terminals and said second conductive terminals are in contact; wherein when the notebook computer is under an open condition at which the display and the operation panel is open, said solar panel is horizontally extended through said protruded element being inserted and received inside said slot to provide on said upper portion of said display or to provide on said computer body of the notebook computer.

* * * * *